US009106920B2

(12) United States Patent
Rusert et al.

(10) Patent No.: US 9,106,920 B2
(45) Date of Patent: Aug. 11, 2015

(54) SCALABLE VIDEO CODING METHOD, ENCODER AND COMPUTER PROGRAM

(75) Inventors: Thomas Rusert, Vista (SE); Kenneth Andersson, Gävle (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 849 days.

(21) Appl. No.: 13/318,426

(22) PCT Filed: May 5, 2009

(86) PCT No.: PCT/EP2009/055389
§ 371 (c)(1),
(2), (4) Date: Dec. 20, 2011

(87) PCT Pub. No.: WO2010/127692
PCT Pub. Date: Nov. 11, 2010

(65) Prior Publication Data
US 2012/0183065 A1     Jul. 19, 2012

(51) Int. Cl.
*H04N 7/12*      (2006.01)
*H04N 19/36*    (2014.01)
(Continued)

(52) U.S. Cl.
CPC .............. *H04N 19/36* (2014.11); *H04N 19/33* (2014.11); *H04N 19/577* (2014.11); *H04N 19/61* (2014.11)

(58) Field of Classification Search
CPC ................................. H04N 7/50; H04N 19/36
USPC ................................................... 375/240.13
See application file for complete search history.

(56) References Cited

U.S. PATENT DOCUMENTS 6,510,177 B1 *  1/2003  De Bonet et al. ........ 375/240.16
8,644,632 B2 *  2/2014  Joshi et al. .................... 382/240
(Continued)

FOREIGN PATENT DOCUMENTS

JP         2008507180 A    3/2008
WO      2007/081189 A1    7/2007
(Continued)

OTHER PUBLICATIONS

Schwarz, H. et al. "SVC Core Experiment 2.1: Inter-Layer Prediction of Motion and Residual Data." International Organisation for Standardisation, ISO/IET JTC 1/SC 29/WG 11/ M11043, Coding of Moving Pictures and Audio, Jul. 2004.
(Continued)

*Primary Examiner* — Sath V Perungavoor
*Assistant Examiner* — James Pontius
(74) *Attorney, Agent, or Firm* — Coats & Bennett, P.L.L.C.

(57) ABSTRACT

A scalable video coding method for coding a video sequence (10) results in a bit stream (10) partitionable into two layer representations ($20_1$, $20_2$) of the video sequence (10). The second layer representation ($20_2$) has an enhanced resolution compared to the first layer representation ($20_1$). The method includes generating (s1) predictive coding parameters for the second layer using previously reconstructed pixels (14) in the second layer. The method further includes performing (s2) prediction for the first layer, using the predictive coding parameters and the previously reconstructed pixels (14) in the second layer, to generate a first layer prediction signal. The method further includes generating (s3) a first layer residual, based on the difference between the original image and the first layer prediction signal. The predictive coding parameters and the first layer residual are coded (s4) as the first layer representation ($20_1$). An encoder (30) and computer program are also provided.

23 Claims, 9 Drawing Sheets

(51) Int. Cl.
*H04N 19/61* (2014.01)
*H04N 19/33* (2014.01)
*H04N 19/577* (2014.01)

(56) References Cited

U.S. PATENT DOCUMENTS

| | | | |
|---|---|---|---|
| 2006/0083309 A1* | 4/2006 | Schwarz et al. | 375/240.16 |
| 2006/0133475 A1* | 6/2006 | Bruls et al. | 375/240.1 |
| 2006/0133503 A1 | 6/2006 | Park et al. | |
| 2007/0211798 A1* | 9/2007 | Boyce et al. | 375/240.16 |
| 2007/0230568 A1 | 10/2007 | Eleftheriadis et al. | |
| 2008/0095450 A1 | 4/2008 | Kirenko | |
| 2011/0103484 A1* | 5/2011 | Reibman et al. | 375/240.16 |

FOREIGN PATENT DOCUMENTS

WO 2008/051995 A2 5/2008
WO 2009/003499 A1 1/2009

OTHER PUBLICATIONS

Schwarz, H. et al. "Overview of the Scalable Video Coding Extension of the H.264/AVC Standard." IEEE Transactions on Circuits and Systems for Video Technology, vol. 17, No. 9, Sep. 2007.

Schwarz, H. et al. "R-D Optimized Multi-Layer Encoder Control for SVC." IEEE International Conference on Image Processing, San Antonio, TX, USA, Sep. 16,-Oct. 19, 2007.

Zhang, R. et al. "Efficient Inter-Layer Motion Compensation for Spatially Scalable Video Coding." IEEE Transactions on Circuits and Systems for Video Technology, vol. 18, No. 10, Oct. 2008.

* cited by examiner

SCALABLE VIDEO CODING METHOD, ENCODER AND COMPUTER PROGRAM

TECHNICAL FIELD

The present invention relates to a scalable video coding method for coding a video sequence into a bit stream. The invention also relates to an encoder, and to computer programs comprising instructions configured, when executed on an encoder, to cause the encoder to carry out the above-mentioned method.

BACKGROUND

Scalable video coding (SVC) enables the coding and transmission of several representations of the same video sequence within a single bit stream, and the removal of one or more representations from the bit stream when necessary or desired, after coding but before transmission. Each representation corresponds to particular temporal, spatial or fidelity resolutions of the video sequence.

The scalability in the context of digital video coding is useful to provide a graceful degradation of resolution in response to a worsening of a transmission condition, such as a decrease of available bandwidth resources, or a change in the network conditions, such as the presence of congestion, or in order to adapt to the capabilities (such as display resolution, processing power or battery power), needs or preferences of the receiver or of the decoder on the receiver side. The scalability, also called bitstream scalability, enables the discarding of certain parts of the bit stream, when necessary or desired, so that the required bit rate can be adapted after encoding, i.e. without requiring a modification of the encoding process itself. Since encoding may be a computer intensive task, it is useful to encode the bit stream for the highest required resolution, and, then, to be able to remove some parts of the bit stream without having to carry out the encoding again. In other words, SVC allows partial transmission and decoding of the bit stream by sending only some of the representations. Each representation coded in the bit stream (also called SVC bit stream) is referred to as a layer.

The lowest layer is called the base layer and the successive higher layers are called enhancement or enhanced layers. Scalability involves at least the coding of a base layer and an enhancement layer. A plurality of enhancement layers may be provided. For instance, the base layer may represent the video sequence at a low spatial resolution (e.g. QVGA, standing for Quarter VGA, i.e. Quarter Video Graphics Array, and corresponding to a 320×240 resolution) while an enhancement layer may represent the video sequence at a higher spatial resolution (e.g. VGA, standing for Video Graphics Array and usually corresponding to a 640×480 resolution). In general terms, for each image (sometimes called "access unit" when coded) in the original video sequence, an enhancement layer provides a refined representation of the image compared to the representation provided by the base layer.

The scalability in video coding is different from simulcast coding, i.e. independently coding each representation. Generally, SVC should be more efficient than simulcast coding. In SVC, the coding of a layer (except for instance for the base layer, which may be coded independently) should reuse some of the bandwidth, or some of the bits in the bit stream, assigned to another layer.

Video coding often involves predictive coding techniques. These techniques are notably based on the coding of the differences between images or pixels considered in a particular order. The order according to which the images or pixels of the video sequence are processed, i.e. predicted, on the encoding side is generally the same as the order according to which they are reconstructed on the decoding side. For instance, the decoding of some images, which may be called anchor images, does not require making use of previously decoded images. The decoding of other images or pictures, in contrast, requires making use of at least one previously decoded picture, which may be called reference picture. Video coding standards usually do not specify a particular method to be used for coding, but they do specify the decoding methods to be used on the receiver side. Predictive coding techniques may imply the following steps on the coding side.

First, coding parameters, also called predictive coding parameters, such as coding modes and motion vectors, are selected in order to most efficiently reconstruct an image to be coded from one or more previously reconstructed images, pixels or blocks of pixels. These coding parameters are coded in the bit stream for transmission.

Secondly, the selected predictive coding parameters are applied to the images of the video sequence on the coding side. The result of this step constitutes the so-called prediction, i.e. how a given image, pixel or block of pixels would be predicted on the decoding side, from the images, pixels or blocks of pixels previously reconstructed on the decoding side, if only these predictive coding parameters were used to decode the image. In other words, the prediction is a prediction on the coding side of how a given image or part thereof will be predicted on the decoding side. For instance, if the parameters are motion vectors, the prediction is then the so-called motion-compensated prediction.

Thirdly, a residual (or prediction error) is computed by computing the differences between (i.e. by subtracting) the original image (the actual picture) and the result of the prediction based on the predictive coding parameters (the predicted picture). The residual is also coded in the bit stream for transmission (along with the predicted coding parameters, as mentioned above).

On the decoding side, the images, pixels or blocks of pixels of the video sequence are reconstructed in the specified order. The predictive coding parameters are used to predict images, pixels or blocks of pixels from the already reconstructed images, pixels or blocks of pixels of the video sequence, and the residual is then used to correct these predictions.

Types of predictive coding techniques include intra coding and inter coding. Intra coding, or intra-picture coding, uses spatial prediction from spatially neighbouring regions in the same image (i.e. from neighbouring pixels or regions to be reconstructed first on the decoding side). Intra-picture coding takes advantage of the spatial correlation between pixel regions of one image. In contrast, inter coding, or inter-picture coding, uses the temporal prediction from temporally neighbouring images (i.e. from neighbouring images to be reconstructed first on the decoding side). Inter-picture coding takes advantage of the temporal correlation between images. Intra and inter coding may be combined.

In addition to these predictive coding techniques, the inter-layer prediction is proper to SVC. In inter-layer prediction, as much information as possible from a lower representation of the video sequence is used for coding a higher representation of the video sequence. In other words, in order to increase the overall coding efficiency, the redundancy between the layers is taken into account by using information from a coded lower layer to predict a higher layer.

An example of video coding standard providing scalability is the H.264/AVC standard (ITU-T, H.264 (11/2007), Series H: Audiovisual and Multimedia Systems, Infrastructure of audiovisual services—Coding of moving video, *Advanced* video coding for generic audiovisual services, ITU-T Recommendation H.264, here referred to as "reference [1]"). Its annex G, entitled "*Scalable video coding*", discloses examples of SVC techniques. An overview of the technology disclosed on this annex is provided in Schwarz H., Marpe D. and Wiegand T., *Overview of the Scalable Video Coding Extension of the H.264/AVC Standard*, IEEE Trans. Circuits Syst. Video Technol., vol. 17, no. 9, pp. 1103-1120, September 2007 (here referred to as "reference [2]"). Section "I." and "II." of reference [2] notably provide explanations on scalability in the context of video coding.

It is desirable to provide methods, encoders and computer programs to improve the efficiency of scalable video coding, without increasing the encoder and decoder complexities as far as possible.

SUMMARY

To meet or at least partially meet the above objectives, such methods, encoders and computer programs according to the invention are defined in the independent claims. Particular embodiments are defined in the dependent claims.

In one embodiment, the scalable video coding method is for coding a video sequence into a bit stream. The resulting bit stream is partitionable into at least a first layer representation and a second layer representation of the video sequence, and the second layer representation has an enhanced spatial or quality (SNR) resolution compared to the first layer representation. The method includes a step of generating predictive coding parameters for the second layer representation of at least one region of an image of the video sequence, using previously reconstructed pixels in the reconstructed second layer representation. The method further includes a step of performing prediction for the first layer representation of the at least one region of the image of the video sequence, using the predictive coding parameters and previously reconstructed pixels in the reconstructed second layer representation, to generate a prediction signal, here referred to as first layer prediction signal. The method further includes a step of generating a residual, here referred to as first layer residual, based on the difference between the at least one region of the image of the video sequence and the first layer prediction signal. The method further includes a step of coding, as at least part of the first layer representation, the predictive coding parameters and the first layer residual.

The phrase "scalable video coding" is used here within the meaning explained in the background section, i.e. a video coding technique which is generally more efficient than simulcast and which enables discarding of a layer representation, such as the second layer representation, from the bit stream after coding and before transmission, when desired. This is also the meaning of "partitionable", in line with the explanations provided in the background section. After creating the bit stream, it is possible to partition the bit stream by discarding some parts thereof to transmit only the first layer representation of the video sequence.

The phrase "scalable video coding" also covers here its applicability in the context of multi-view coding or scalable multi-view coding. In multi-view coding, rather than coding a single camera view as in conventional video coding, multiple views are coded together in one bit stream. For efficient multi-view coding, predictive coding methods may be applied. Those may include similar motion-compensated inter prediction and intra prediction methods as in single view video coding. Additionally, prediction between different views may be applied, which may then be disparity compensated. Here, disparity compensation is analogous to motion compensation for inter prediction, except that the pictures are from different views at the same point in time, rather than from the same view at different points in time. An example for multi-view video coding is the "Multiview video coding" amendment to the H.264/AVC standard, which is under development, as of April 2009. Like conventional video coding, multi-view video coding may include scalability features, to which the invention may be applied, in one embodiment.

A bit stream may be transmitted on a communication channel, such as a wireless communication channel. The bit stream may also be stored on a computer-readable medium for later decoding of its content. A bit stream is a sequence of bits that forms the representation(s) of coded pictures and associated data forming one or more coded video sequences.

The first layer representation and the second layer representation may be a base layer and an enhancement layer respectively. Alternatively, the first layer representation and the second layer representation may be a first enhancement layer and a second enhancement layer respectively, wherein the second enhancement layer has an enhanced spatial or quality (SNR) resolution compared to the first enhancement layer.

The generated predictive coding parameters are parameters used to efficiently reconstruct an image to be coded from one or more previously reconstructed images. While the words "reconstruct" and "reconstructed" more properly reflect the reconstruction process on the decoding side, they are used here to reflect the coding, on the coding side, of the necessary information in the bit stream to enable the reconstruction on the decoding side. The predictive coding parameters may for instance express (the predictive coding parameters are in this case mode decision parameters) whether the spatial neighbourhood is used in intra-coding (and if so which intra coding modes are used, i.e. the predictive coding parameters are in this case intra coding mode decision parameters), whether the temporal neighbourhood in inter-coding (such as selection of coding vectors, i.e. the predictive coding parameters are in this case mode estimation parameters), or whether both are used.

The predictive coding parameters are generated for the second layer representation, i.e. on the basis of image information in the resolution of the second layer representation. In other words, the selection or generation of the predictive coding parameters occurs on the second layer.

The prediction is then performed, based on the predictive coding parameters generated in the second layer and using the previously reconstructed pixels from the second layer (i.e., in other words, from what may be called the reconstructed second layer representation), to generate a prediction signal in the first layer. The prediction signal in the first layer, i.e. the first layer prediction signal, is the predicted pixels of the at least one region of the image at the resolution of the first layer representation.

The first layer residual is then generated by subtracting the first layer prediction signal from the original, uncompressed image at the resolution of the first layer. The predictive coding parameters and the first layer residual (possibly first quantized) are then coded in the bit stream as part of the first layer representation, i.e. in the sections of the bit stream associated with or assigned to the first layer representation.

The invention provides efficient encoding in a SVC mode, i.e. provides good compression efficiency in SVC mode. Good compression efficiency refers here to a low video noise level achieved for a certain bit rate. At the same time, the computational complexity and memory consumption are substantially not increased.

To understand in more details the technical effects of the invention over the prior art, it is useful to compare the invention to the so-called SVC bottom-up encoding process. In the bottom-up encoding process, first, the encoding for the base layer takes place (without consideration for the subsequent enhancement layer encoding), and then the encoding is performed in sequential order for the subsequent enhancement layers. This results in an uneven distribution of the coding efficiency losses amongst the base layer and the enhancement layers. This also results in suboptimal compression efficiency for the enhancement layers.

A solution to these problems of bottom-up encoding is proposed in Schwarz H. et al, *R-D optimized multi-layer encoder control for SVC*, ICIP 2007, pages II-281-284. The joint BL-EL optimization proposed in this paper may however lead to increased complexity. The invention proposes another solution for increasing the enhanced layer compression efficiency while keeping the coding complexity as low as possible.

In one embodiment, the method is such that the step of performing prediction to generate the first layer prediction signal includes performing at least one of motion-compensated prediction, intra-coding prediction and disparity-compensated prediction.

A combination of two or three of these three prediction techniques may be used for all or some regions or macroblocks of some pictures.

In one embodiment, the method further includes the step of coding, as at least part of the second layer representation, an indication, here referred to as telescopic indication, indicating that, when decoding, the predictive coding parameters associated with the first layer representation are to be used also for the second layer representation.

This embodiment enables efficient encoding of the second layer representation, without requiring coding again predictive coding parameters for the second layer representation.

In a sub-embodiment of this embodiment, the step of coding, as at least part of the second layer representation, further includes coding an indication, here referred to as inter-layer prediction residual indication, indicating that, when decoding, the first layer residual is to be used for generating a residual, here referred to as second layer residual, approximating the difference between the at least one region of the image of the video sequence and a second layer prediction signal.

This sub-embodiment enables both efficient encoding of the predictive coding parameters and the residual for the second layer representation.

In another sub-embodiment of this embodiment, or in combination with the above-mentioned sub-embodiment, the method further includes steps of performing prediction for the second layer representation of the at least one region of the image of the video sequence, using the predictive coding parameters and previously reconstructed pixels in the reconstructed second layer representation, to generate a prediction signal, here referred to as second layer prediction signal; and generating a residual, here referred to as second layer residual, based on the difference between the at least one region of the image of the video sequence and the second layer prediction signal; wherein the step of coding, as at least part of the second layer representation, further includes coding the second layer residual.

In an embodiment wherein the two above sub-embodiments are combined, both the interlayer prediction residual indication indicating that, when decoding, the first residual is to be used for generating the second layer residual and the second layer residual are used together to reconstruct the at least one region of the image of the video sequence. This enables optimal use of the interlayer redundancies.

In one embodiment, the step of performing prediction to generate the second layer prediction signal includes performing at least one of motion-compensated prediction, intra-coding prediction and disparity-compensated prediction.

A combination of two or three of these three prediction techniques may also be used for all or some regions or macroblocks of some pictures, when performing prediction to generate the second layer prediction signal.

In one embodiment, the method is such that the step of generating predictive coding parameters includes selecting at least one of an inter coding technique and an intra coding technique, and generating, in accordance with the selecting step, at least one of, if an inter coding technique has been selected, inter coding parameters, and if an intra coding technique has been selected, intra coding parameters.

In one embodiment, the method is such that the steps of generating predictive coding parameters and generating the first layer residual are optimized with respect to the second layer representation. This enables efficient coding for the second layer representation.

In one embodiment, the method is such that the second layer representation has an enhanced spatial resolution compared to the first layer representation, and the step of performing prediction to generate the first layer prediction signal is carried out using the predictive coding parameters and previously reconstructed pixels in the reconstructed second layer representation, after downsampling the predictive coding parameters and the previously reconstructed pixels in the reconstructed second layer representation.

In this embodiment, wherein spatial scalability is achieved, by downsampling the predictive coding parameters generated for the second layer representation and by downsampling the previously reconstructed pixels in the second layer representation, the step of performing prediction to generate the first layer prediction signal can be performed using predictive coding parameters adapted to the resolution of the first layer representation. This may include for instance reducing the resolution of motion vectors.

In one embodiment, the method is such that the second layer representation has an enhanced quality (SNR) resolution compared to the first layer representation, and the step of performing prediction to generate the first layer prediction signal is carried out using the predictive coding parameters, without any modification to the predictive coding parameters.

In this embodiment wherein quality (SNR) scalability is achieved, the first layer prediction signal may be generated in a simple manner without requiring any adaptation of the predictive coding parameters generated for the second layer representation.

In one embodiment, the method is such that the step of generating predictive coding parameters includes selecting at least an inter coding technique, and generating at least inter coding parameters in such a manner that the at least one region of an image of the video sequence is predictively coded as a B slice. A B slice is a slice that may be decoded using intra-layer intra prediction or inter prediction using at most two motion vectors and references to predict the sample values of each block.

In addition, bottom-up encoding may be used in the invention for some picture regions or pictures, while not used for other picture regions or pictures.

The invention also relates, in one embodiment, to a scalable video encoder configured for coding a video sequence into a bit stream. The resulting bit stream is partitionable into at least a first layer representation and a second layer representation of the video sequence. The second layer representation has an enhanced spatial or quality resolution compared to the first layer representation. The encoder includes a predictive coding parameters generating unit, a first layer prediction performing unit, a first layer residual generating unit, and a first layer representation coding unit. The predictive coding parameters generating unit is configured for generating predictive coding parameters for the second layer representation of at least one region of an image of the video sequence, using previously reconstructed pixels in the reconstructed second layer representation. The first layer prediction performing unit is configured for performing prediction for the first layer representation of the at least one region of the image of the video sequence, using the predictive coding parameters and previously reconstructed pixels in the reconstructed second layer representation, to generate a prediction signal, here referred to as first layer prediction signal. The first layer residual generating unit is configured for generating a residual, here referred to as first layer residual, based on the difference between the at least one region of the image of the video sequence and the first layer prediction signal. The first layer representation coding unit is configured for coding, as at least part of the first layer representation, the predictive coding parameters and the first layer residual.

The invention also relates, in one embodiment, to a computer program including instructions configured, when executed on an encoder, to cause the encoder to perform the above-mentioned method.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
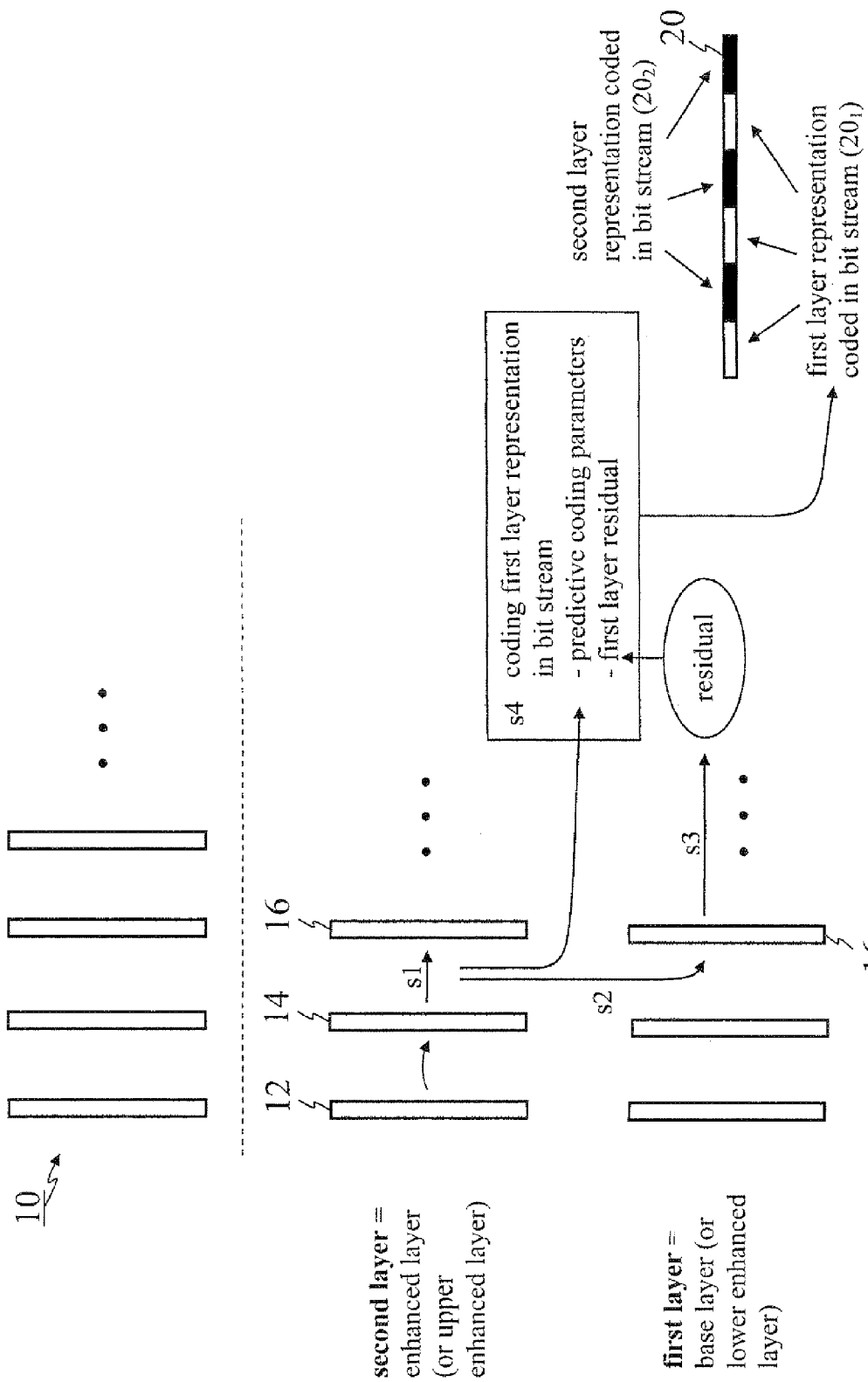
FIG. 1 is a schematic diagram illustrating steps of a method in one embodiment of the invention, with a picture's region being coded using inter-picture predictive coding techniques.

FIG. 1 is a schematic diagram illustrating steps of a method in one embodiment of the invention. A video sequence 10 is depicted on the top of FIG. 1 with four exemplary pictures or frames. This video sequence 10 constitutes the input of the method in this embodiment. The output of the method is a bitstream 20 shown at the bottom-right corner of FIG. 1. The bitstream 20 includes bits (white sections of the bitstream 20) assigned to the coded first layer representation $20_1$, and bits (black sections of the bitstream 20) assigned to the coded second layer representation $20_2$. Although the size of the bit sections of the bitstream 20 assigned to the first layer representation $20_1$ and to the second layer representation $20_2$ respectively are shown as being equal, this need not be the case.

Under the dotted line below the illustrated video sequence 10, a second layer and a first layer are schematically illustrated. The first layer may be a base layer and the second layer may be an enhanced layer (EL). Alternatively, the first layer may be a first enhanced layer and the second layer may be a second enhanced layer, offering a finer resolution than the first enhanced layer. The process illustrated in FIG. 1 relates to the coding of a region 16 of an image of the video sequence 10. Both the first layer representation and the second layer representation of the region 16 are to be coded in the bitstream 20. In FIG. 1, the pixels of region 16 are coded using an inter-picture prediction technique. That is, in the case illustrated in FIG. 1, pixels from a previous picture 14, i.e. previously reconstructed pixels 14, are used for predictive coding of region 16.

Picture 12 is an anchor picture which is coded using an intra-picture predictive coding technique. Then, picture 14 is coded using an inter picture coding technique based on the pixels previously reconstructed in picture 12. In step s1, predictive coding parameters for region 16 in its second layer resolution are generated using previously reconstructed pixels 14 in the second layer.

For instance, the generated predictive coding parameters in step s1 may be coding modes indicating e.g. whether inter or intra coding is used and/or motion vectors. Furthermore, for one picture of the video sequence 10 to be coded, within said picture, different processes may be applied to different parts of the picture, notably depending on the location in the picture and/or depending on the content of the picture. That is, different coding techniques may be used for different regions of a picture to be coded. A fortiori, different coding techniques may be used for different pictures of the video sequence 10.

In step s2, prediction is performed for the first layer representation $20_1$ of region 16 using the predictive coding parameters generated in step s1 and the previously reconstructed pixels 14 of the second layer. A prediction signal, called here first layer prediction signal, is thus generated.

In one embodiment, step s2 includes downsampling for spatial scalability. In one embodiment, downsampling is not included for SNR scalability, and the motion information (which is an example of predictive coding parameters) from step s1 is applied without modification. However, in one embodiment where SNR scalability is achieved, some conversion is carried out, for instance in case of motion compensation block sizes supported by the used standard in the enhancement layer (EL) but not supported by said standard in the base layer (BL). In one embodiment, if there is no difference in supported motion compensation block size between base layer and enhancement layer, no conversion is carried out for SNR scalability.

Afterwards, in step s3, the differences between the region 16 of the original uncompressed image and the first layer prediction signal are computed to generate the first layer residual.

In step s4, the predictive coding parameters generated in step s1 (possibly downsampled and/or converted) and the first layer residual are coded as at least part of the first layer representation $20_1$. Additional parameters or information may also be coded as part of the first layer representation $20_1$. This forms the first layer representation $20_1$ coded in the bitstream 20. The second layer representation $20_2$ is also coded into the bitstream 20 using inter-layer prediction coding techniques (not illustrated in FIG. 1).

Figure 2:
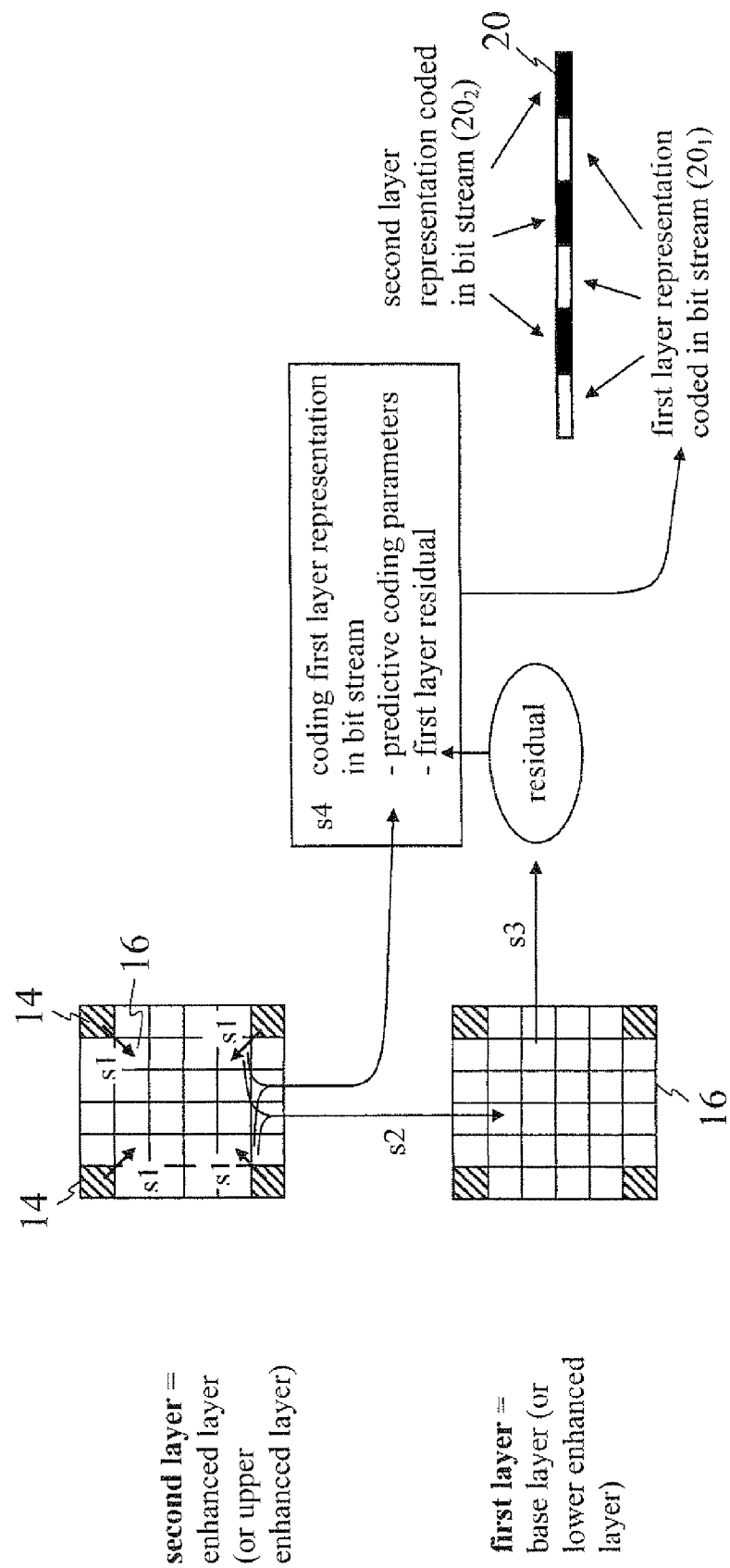
FIG. 2 is a schematic diagram illustrating steps of a method in one embodiment of the invention, with a picture's region being coded with intra-picture predictive coding techniques.

The schematic diagram of FIG. 2 differs from the diagram of FIG. 1 in that, in step s1, the previously reconstructed pixels 14 are from the same picture as the pixels of the region 16 to be coded. In other words, step s1 of generating predictive coding parameters for the second representation of region 16 includes generating intra-coding parameters. This is illustrated by the arrows labelled "s1" in the picture on top of FIG. 2.

As shown in FIG. 2, the pixel resolution of region 16 in the second layer and the pixel resolution of region 16 in the first layer are illustrated as being the same. In spatial scalability however, this is not the case. That is, the pixel resolution of region 16 in the first layer is less refined that the pixel resolution of region 16 in the second layer.

Figure 3:
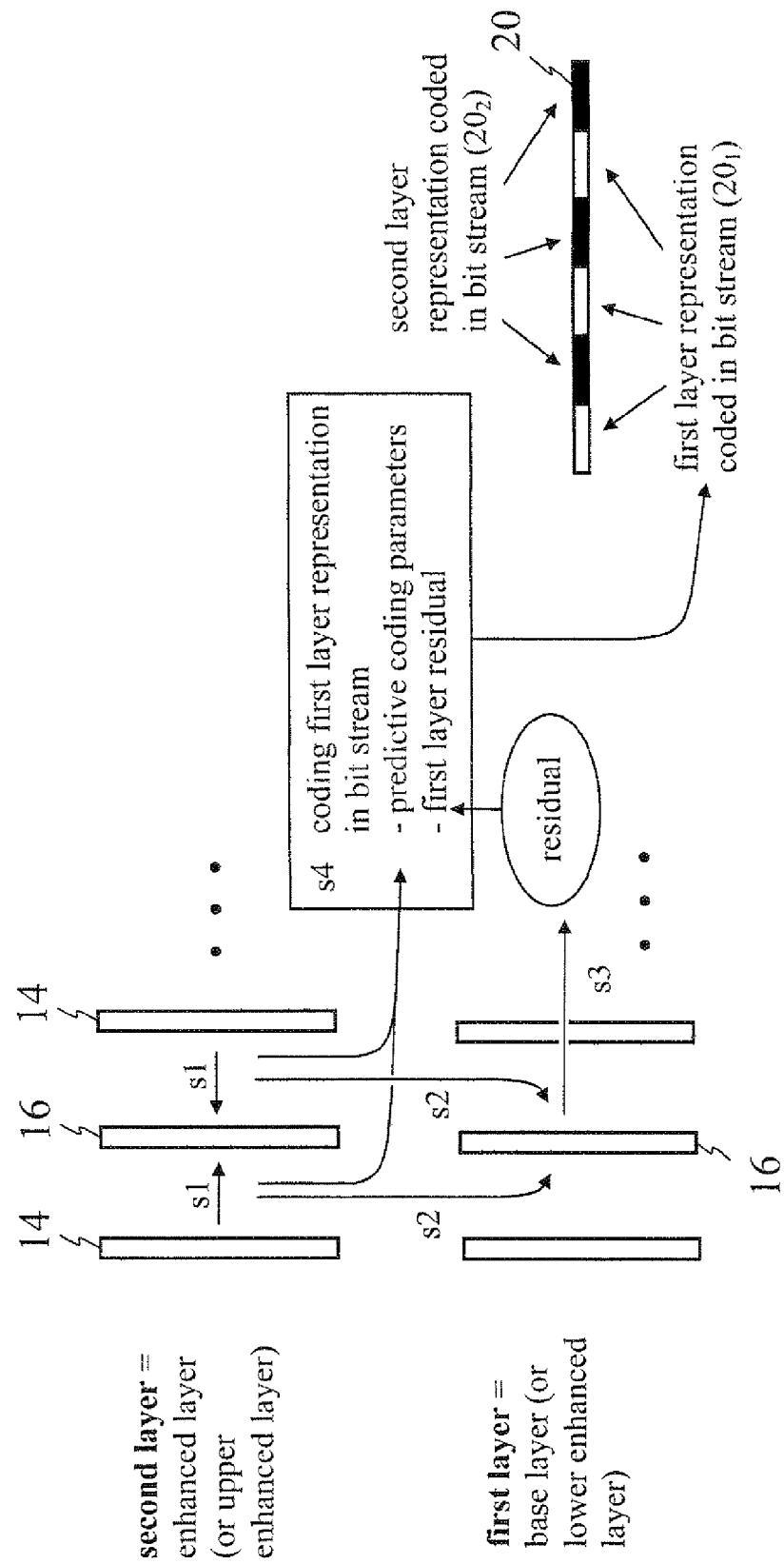
FIG. 3 is a schematic diagram illustrating steps of a method in one embodiment of the invention, with a picture's region being coded with inter-picture predictive coding techniques using two neighbouring images.

The schematic diagram of FIG. 3 differs from the diagram in FIG. 1 as follows. The previously reconstructed pixels 14 used in step s1 originate in the video sequence 10 from both a first image 14 preceding the image of region 16 and a second image 14 coming after the image of region 16. The reconstruction (prediction) order need not be the same as the order of the images in the video sequence 10.

Figure 4:
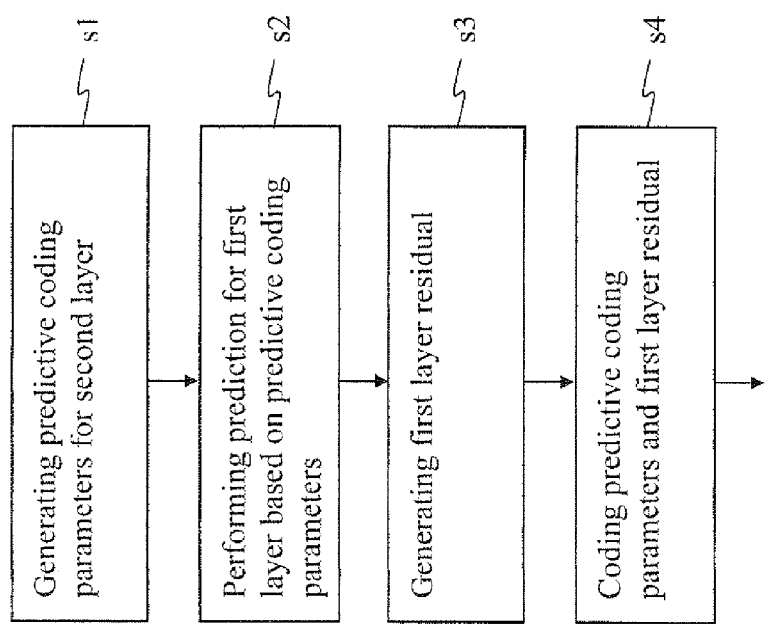
FIG. 4 is a flow chart illustrating steps of a method in one embodiment of the invention.

FIG. 4 is a flow chart of the method in one embodiment of the invention. In step s1, predictive coding parameters are generated for the second layer representation $20_2$ of at least one region 16 of an image of the video sequence 10, using previously reconstructed pixels 14 in the reconstructed second layer representation $20_2$. In step s2, prediction is performed for the first layer representation $20_1$ of the at least one region 16 of the image of the video sequence 10, using the predictive coding parameters generated in step s1 and using the previously reconstructed pixels 14 in the reconstructed second layer representation $20_2$. The output of step s2 is the first layer prediction signal.

In step s3, a first layer residual is generated from the differences between the original, uncompressed region 16 of the image of the video sequence 10 and the first layer prediction signal generated in step s2. The predictive coding parameters generated in step s1 and the first layer residual generated in step s3 are then coded in step s4 as at least part of the first layer representation in the bitstream 20.

Figure 5:
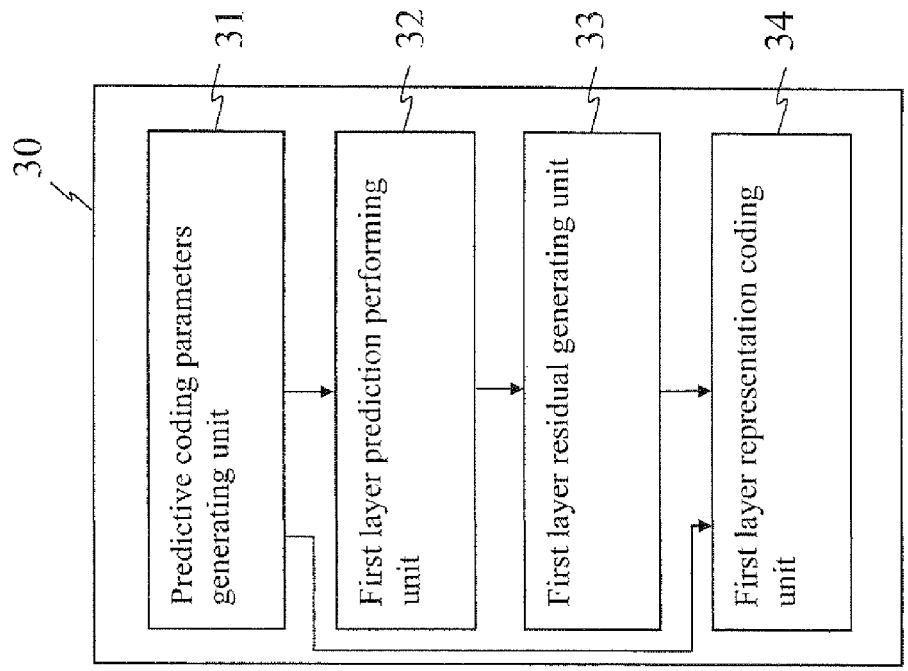
FIG. 5 schematically illustrates an encoder in one embodiment of the invention.

FIG. 5 schematically illustrates an encoder 30 in one embodiment of the invention. The encoder 30 includes a predictive coding parameter generating unit 31, a first layer prediction performing unit 32, a first layer residual generating unit 33, and a first layer representation coding unit 34, which are respectively configured to carry out steps s1 to s4 as described with reference to FIG. 4.

In order to generate the predictive coding parameters, one type of encoding optimization methods is denoted in the art as rate-distortion (R-D) optimization. In R-D optimized motion estimation and mode decision, the encoder performs trial encoding of several (or all) possible mode/motion settings, generating a cost measure according to a cost criterion for each of them. After testing the different modes, the one with the least cost measure is selected. Typically the R-D optimization method is performed by the encoder, and typical configuration parameters determining its operation are the quantization parameter QP and the Lagrangian multiplier $\lambda$.

For SVC with two layers, namely a base layer (BL) and an enhancement layer (EL), there is a possible trade-off between BL and EL compression efficiency:

(i) If the BL coding is optimized on its own, the coding modes selected in the EL might not be optimal with respect to the subsequent EL encoding (i.e. some of the bits spent in the BL may be useless for the EL), resulting in suboptimal EL compression efficiency.

(ii) Some reduction of BL compression efficiency might be acceptable if the EL compression efficiency can be improved instead.

Case (i) above is carried out by first encoding the BL and then encoding the EL ("bottom-up encoding"). However, case (ii), i.e. optimizing EL quality, is often more desirable. This is because in many applications the EL quality is more important or valuable than the BL quality (e.g. because consumers of the EL quality may expect more for the service they have subscribed to). However, it is not straightforward to achieve the desired behavior. The invention provides a solution inspired by the objectives of case (ii). However, it is useful to discuss both cases to understand the benefits of the invention.

Figure 6:
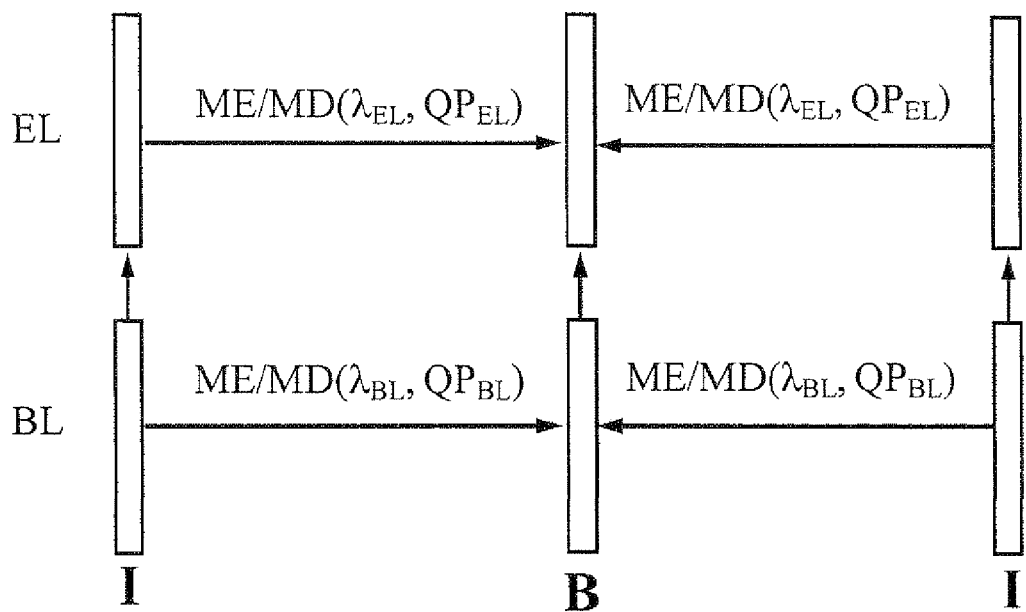
FIG. 6 schematically illustrates a SVC bottom-up encoding approach for better understanding the problems addressed and salved by the invention.

FIG. 6 schematically illustrates a bottom-up encoding approach for SVC. This does not form an embodiment of the invention but this is discussed here for understanding the problems addressed and solved by the invention. The encoder operation is illustrated for bottom-up encoding (I-B-I prediction structure). BL pictures are at the bottom of the figure, EL pictures are at the top of the figure. Vertical arrows illustrate inter-layer prediction. For BL encoding, motion estimation (ME) and mode decision (MD) as well as motion-compensated prediction (MCP) are performed using BL reference pictures, and EL optimization parameters $\lambda_{BL}$, $QP_{EL}$. For EL encoding, ME/MD and MCP are performed using EL reference pictures, and EL optimization parameters $\lambda_{EL}$, $QP_{EL}$.

First, the BL picture is encoded to optimize its compression efficiency, without involvement of EL aspects at that stage (in contrast with the invention). Then, the EL picture is encoded by taking into account the already encoded BL picture, i.e. by using inter-layer prediction techniques, to optimize the EL compression efficiency.

The ME and MD processes are performed for each layer picture of the access unit (AU). The bottom-up encoding is more complex than Advanced Video Coding (AVC, H.264/MPEG-4 AVC) encoding (where only one picture per AU is present). However, while the bottom-up encoding approach optimizes BL compression efficiency, it is generally suboptimal in terms of EL compression efficiency.

Still with reference to FIG. 6, the characteristics of bottom-up encoding may be described in other words as follows:

For each AU, BL encoding is first performed, and EL encoding is then performed. Both for BL and EL encoding, ME/MD processes are performed.

For ME/MD and MCP in the BL, the encoder uses reconstructed BL pictures as inter prediction references. BL-specific optimization settings ($\lambda_{BL}$, $QP_{BL}$) are used.

For ME/MD and MCP in the EL, the encoder uses reconstructed EL pictures as inter prediction references. EL-specific optimization settings ($\lambda_{EL}$, $QP_{EL}$) are used.

Figure 7:
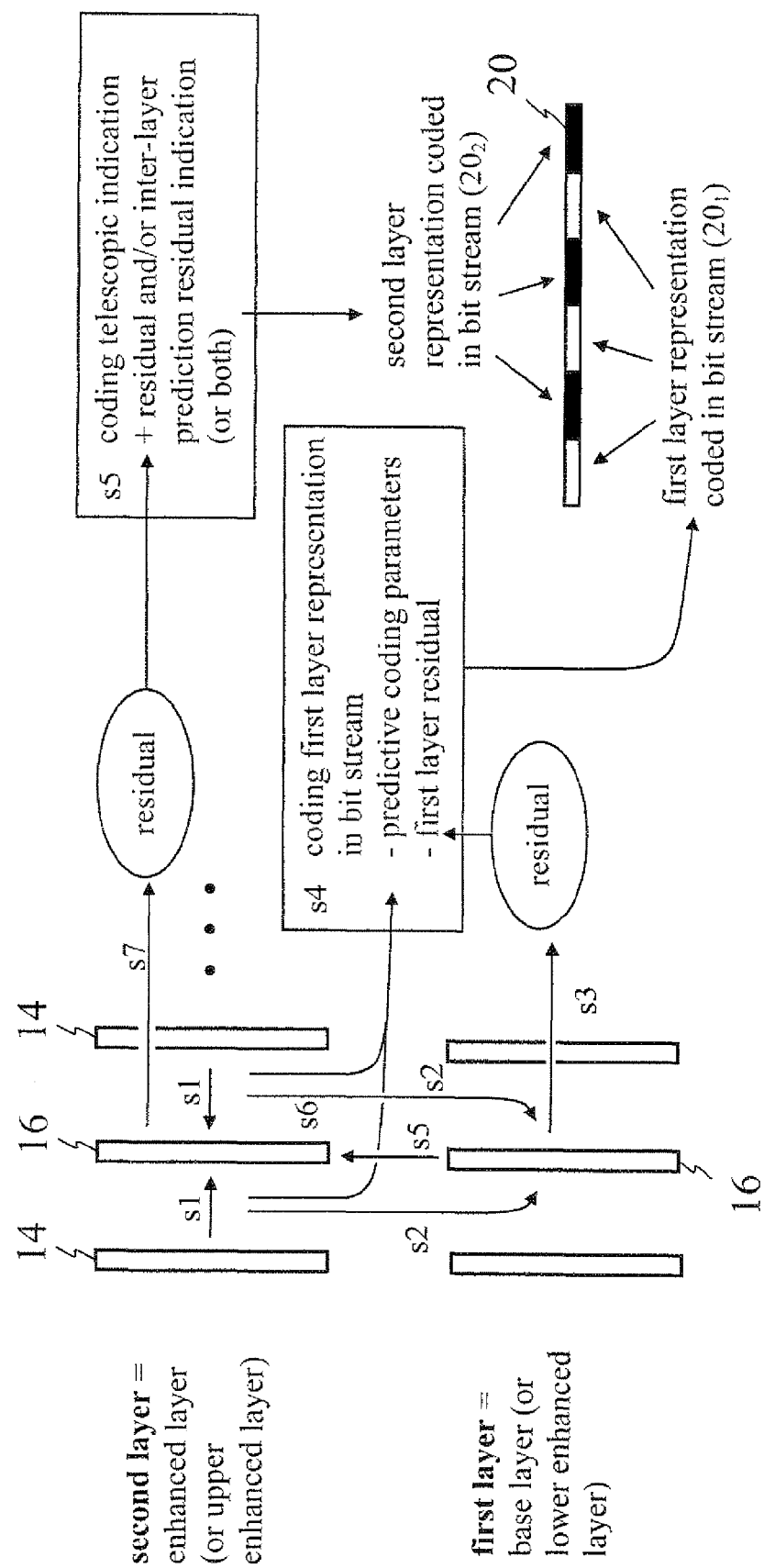
FIG. 7 is a schematic diagram illustrating steps of a method in one embodiment of the invention, with a picture's region being coded using inter-picture predictive coding techniques using two neighbouring images.

FIG. 7 is a schematic diagram illustrating steps of method in one embodiment of the invention. It differs from the embodiment illustrated in FIG. 3 in that steps s5, s6 and s7 are used to form (i.e. to code) at least a part of the second layer representation $20_2$ in the bitstream 20.

In step s5, as illustrated by the vertical arrow from the region 16 in the first layer to the region 16 in the second layer and as illustrated as well by the box "s5 coding telescopic indication . . . " in the top right corner of FIG. 7, a telescopic indication is coded as at least part of the second layer representation $20_2$. The telescopic indication indicates that, when decoding, the predictive coding parameters associated with the first layer representation $20_1$ are to be used also for the second layer representation $20_2$.

Optionally, the step of coding s5, as at least part of the second layer representation $20_2$, may further include coding an inter-layer prediction residual indication. The inter-layer prediction residual indication indicates that, when decoding, the first layer residual is to be used for generating a second layer residual approximating the differences between the at least one region 16 of the original, uncompressed image and a second layer prediction signal. In other words, the first layer residual is to be used for generating the correction (second layer residual) to be applied to the pixels reconstructed based on the telescopic indication.

In combination with the inter-layer prediction residual indication or, instead, without using an inter-layer prediction residual indication, the following steps s6 and s7 may be performed.

Step s6 includes performing prediction for the second layer representation $20_2$ of region 16 using the predictive coding parameters and previously reconstructed pixels 14 in the reconstructed second layer representation $20_2$. The output of step s6 is a second layer prediction signal.

Step s7 includes generating a second layer residual by computing the differences between the original, uncompressed pixels of region 16 and the second layer prediction signal generated in step s6.

The step of coding s5, as at least part of the second layer representation $20_2$, then additionally includes coding the second layer residual which has been generated in step s7. The completion of step s5 thus takes place in this case after steps s6 and s7, in order to also code the second layer residual.

In one embodiment, a second layer representation coding unit, a second layer prediction performing unit, and a second layer residual generating unit (not illustrated) are additionally provided in the encoder 30 to respectively perform steps s5, s6 and s7 described with reference to FIG. 7.

Figure 8:
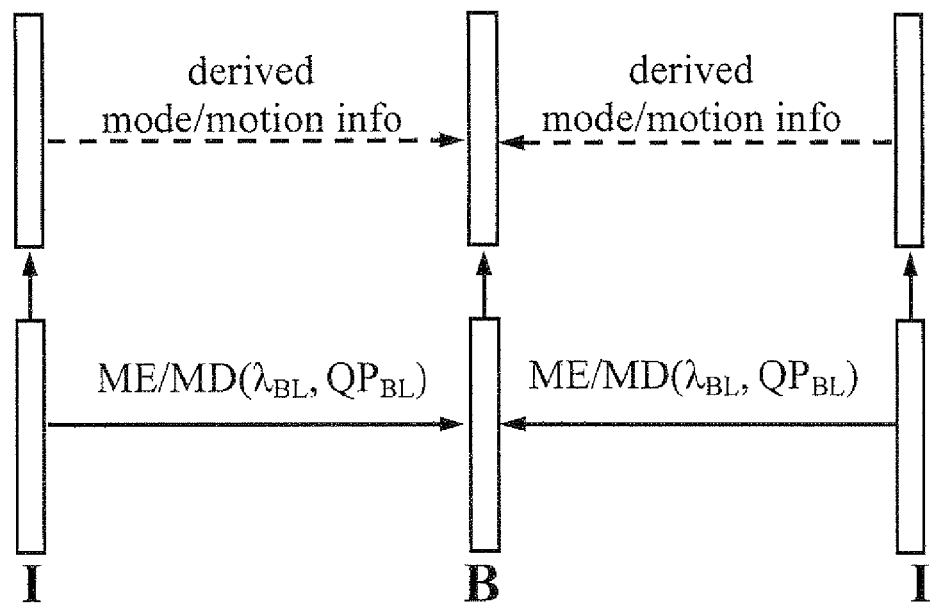
FIG. 8 schematically illustrates the use of telescopic mode flags in the prior art, to better understand the problems addressed and solved by the invention.

FIG. 8 illustrates a possible view of the use of telescopic mode flags in POT application WO2008/051995, here discussed for better understanding some prior art problems addressed and solved by the invention. Instead of transmitting separate mode and motion information in the EL, a flag is transmitted that indicates that, in the EL, the mode and motion information is inherited or derived from the mode and motion information in the BL. FIG. 8 illustrates the encoding operation with telescopic mode flags (I-B-I prediction structure). BL pictures are at the bottom of the figure, EL pictures are at the top of the figure. Vertical arrows illustrate inter-layer prediction. For BL encoding, ME/MD and MCP are performed using EL reference pictures, and EL optimization parameters $\lambda_{BL}$, $QP_{BL}$. For EL encoding, ME and MD are not performed. Instead, the motion and mode parameters are derived from the BL. MCP is performed by using EL reference pictures.

If the encoder uses this mechanism for some AUs, the ME/MD process for the EL may be saved for these AUs, and the encoding complexity is reduced compared to bottom-up encoding. On the other hand, since ME/MD information is not specifically optimized for the EL, the EL compression efficiency suffers.

Still with reference to FIG. 8, the characteristics of telescopic mode flags may be described as follows:

For each AU, first BL encoding is performed, and then EL encoding is performed. ME/MD processes are performed for the BL only.

For ME/MD and MCP in the BL, the encoder uses decoded BL pictures as inter prediction references. BL-specific optimization settings ($\lambda_{BL}$, $QP_{BL}$) are used.

In the EL, the motion and mode parameters are derived from those in the BL. For MCP in the EL, the encoder uses decoded EL pictures as inter prediction references.

Figure 9:
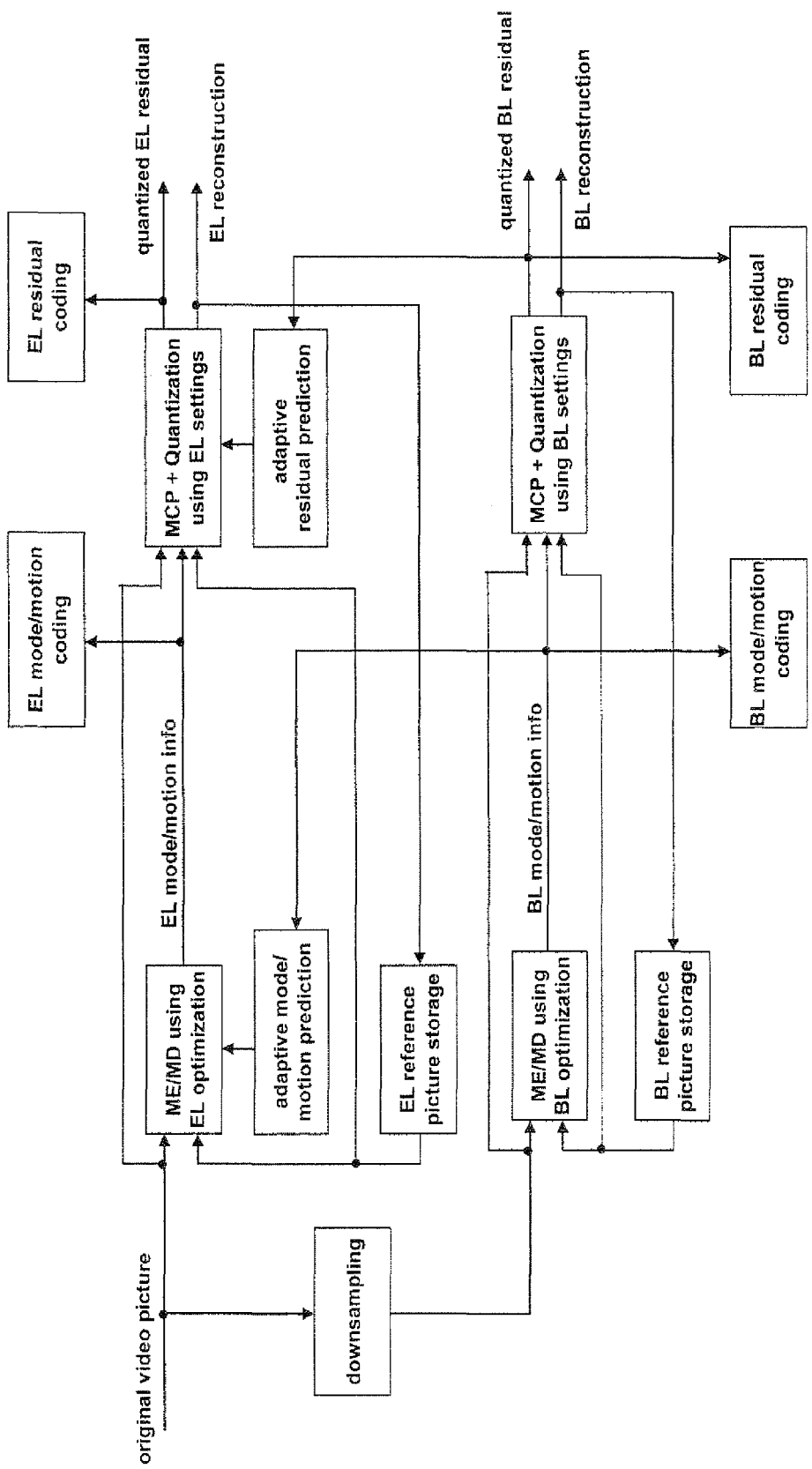
FIG. 9 further illustrates a bottom-up encoding approach, similar to the one described with reference to FIG. 6, to better understand the problems addressed and solved by the invention.

FIG. 9 further illustrates a bottom-up encoding approach (similar to the one illustrated with reference to FIG. 6) for SVC, which does not form an embodiment of the invention but is here discussed for better understanding the problems addressed and solved by the invention. A brief explanation of the elements of the bottom-up encoder is as follows.

The "downsampling" operation takes the original video picture as input and generates a possibly downsampled original picture for the BL coding.

The ME/MD operation takes an original picture and one or more reference pictures to perform ME/MD and determine mode and motion information, e.g. by using R-D optimization. The ME/MD operation is optimized either for EL compression efficiency (top) or BL compression efficiency (BL).

The adaptive mode/motion prediction operation is part of the inter-layer prediction process of SVC. It adaptively uses BL mode/motion information to predict EL mode/motion information.

The reference picture storage stores reconstructions of previously coded pictures to be used for prediction.

The MCP+Quantization operation takes the original video picture, mode/motion information and reference picture(s) to generate the prediction residual signal, which is then quantized. Quantization is done either using EL quantization settings (top) or BL quantization settings (bottom). Output is the quantized residual signal and the reconstructed picture at the respective (BL or EL) quality. This picture can be used as reference picture for subsequently coded pictures.

The adaptive residual prediction operation is part of the inter-layer prediction process of SVC. It adaptively uses BL residual information to prediction the EL residual signal. For both the BL and EL, respectively, mode/motion information and quantized residual information are coded into the compressed bit stream.

Figure 10:
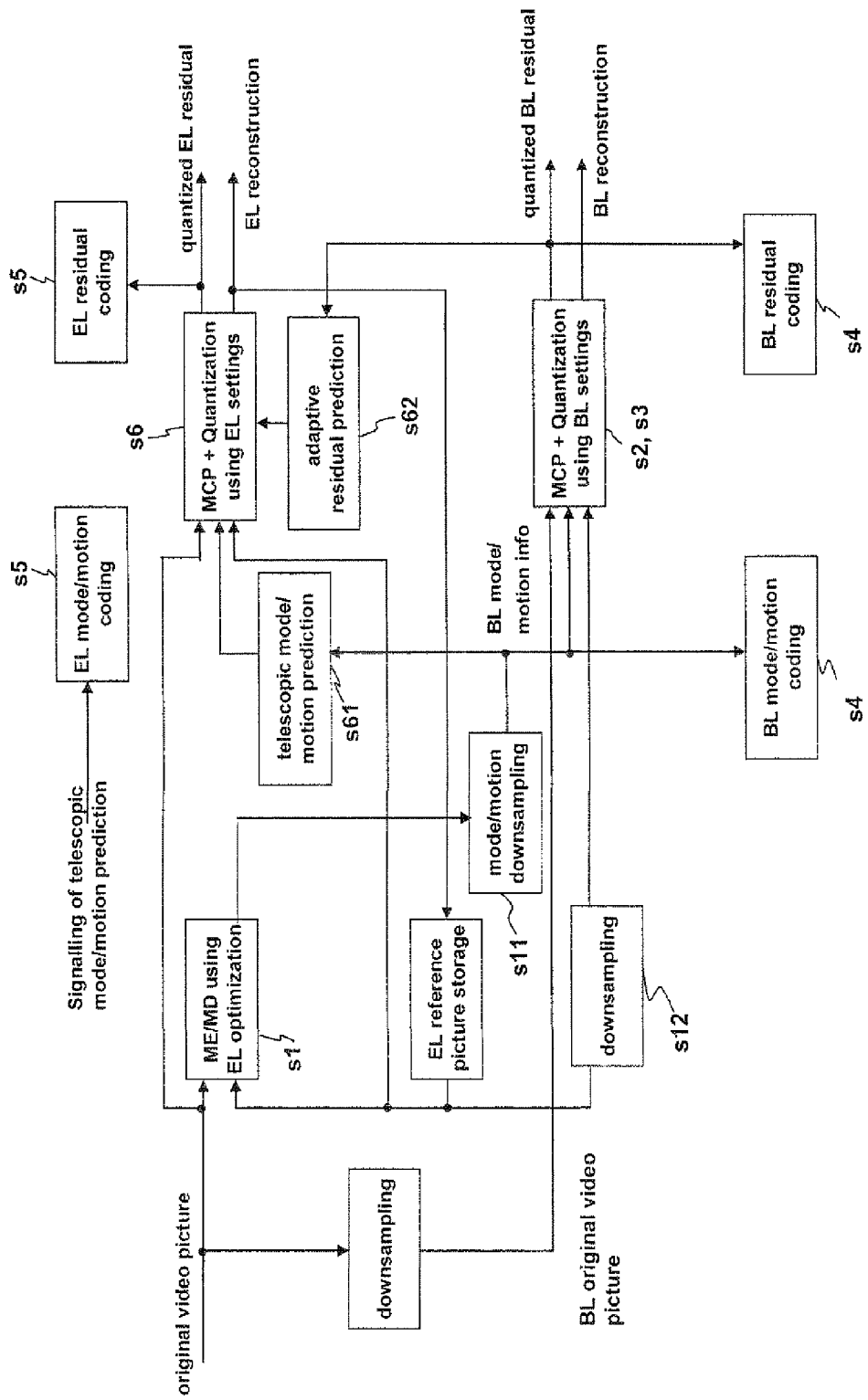
FIG. 10 is a schematic diagram illustrating steps of a method performed in an encoder in one embodiment of the invention.

In contrast, a method and encoder 30 in one embodiment of the invention are schematically illustrated in FIG. 10.

Using an original video picture and the EL reference picture (coming from the unit labelled "EL reference picture storage"), ME/MD with EL optimization is performed s1 (unit labelled "ME/MO using EL optimization"). Step s1 may likewise apply for both inter coded blocks and intra coded blocks (both are included in the MD process). The resulting mode/motion information is possibly downsampled s11 (unit labelled "mode/motion downsampling"), then constituting the BL mode/motion information. The EL reference picture is also possibly downsampled s12.

The BL mode/motion information, the downsampled EL reference picture, and the BL original video are inputted to the MCP+Quantization stage s2, s3 used to generate the BL residual (unit labelled "MCP+Quantization using EL settings"). The output includes the quantized residual signal. The output also includes the BL reconstruction signal, but that signal (first layer prediction signal) may not be further required.

The BL mode/motion information is coded s4 into the compressed bitstream 20 (unit labelled "BL mode/motion coding").

The BL mode/motion information is also fed into the telescopic mode/motion prediction operation s61, being possibly upsampled, then constituting the EL mode/motion information for the MCP+Quantization stage s6 for EL coding (unit labelled "MCP+Quantization using EL settings"). The BL residual may also be used adaptively s62 (unit labelled "adaptive residual prediction") as an input of the MCP+Quantization stage s6 for EL encoding.

Instead of coding the full EL mode/motion information, use of telescopic mode/motion prediction is signalled s5 in the bitstream 20 (unit labelled "Signalling of telescopic mode/motion prediction" and arrow leading to the unit labelled "EL mode/motion coding").

The MCP+Quantization stage s6 for EL coding operates in the same manner as in the bottom-up encoding approach.

The EL and BL coding stages operate in the same manner as in the bottom-up encoding approach.

In one embodiment, the method may be applied to all pictures in the video sequence 10. In another embodiment, the encoder 30 switches between the above-described bottom-up encoding and the encoding as described with reference to FIG. 10. For example, experiments with so-called "hierarchical B picture prediction" structures have indicated that it may be useful in terms of compression efficiency to use the proposed method with B pictures, while using the conventional encoding with I pictures and P pictures.

Figure 11:
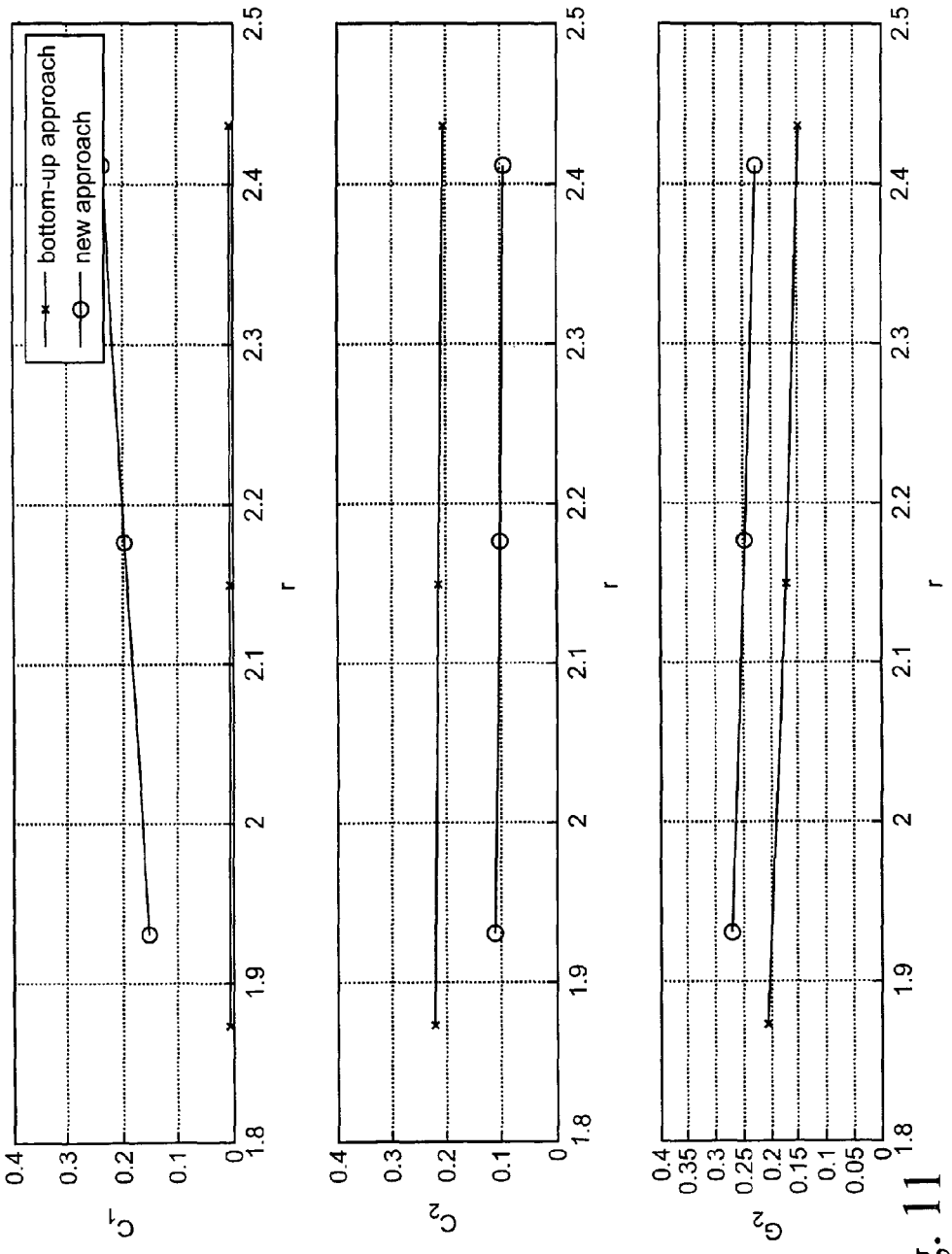
FIG. 11 shows experimental data obtained with a method in one embodiment of the invention.

FIG. 11 shows experimental data obtained with a method in one embodiment of the invention (referred to here, as well as in FIG. 11, as "new approach"). The following experimental setup was used: Scalable high profile, SNR scalability with 1 SNR enhancement layer, first picture coded as I picture, every $16^{th}$ picture coded as P picture, remaining pictures coded as hierarchical B pictures. The graphs compare the performance of the bottom-up approach (line with diagonal crosses "x") and the new approach (line with circles "o"). In the example shown, the new approach was applied only for the B pictures, while I and P pictures were coded using bottom-up approach. Simulations were configured such that constant enhancement layer quality was achieved (indicated by the value of $PSNR_{EL}$ shown in the title of FIG. 11).

The two graphs on the top represent the relative cost $C_1$ and $C_2$ for base layer and enhancement layer, respectively, against non-scalable AVC coding (H.264/AVC high profile with similar coding structure) plotted for different bit rate ratios r between enhancement layer and base layer (measured in terms of H.264/AVC bit rates required to achieve equivalent Peak-Signal-to-Noise-Ratio (PSNR) quality). The graph at the bottom shows the relative gain $G_2$ against AVC simulcast coding.

The cost figures represent the inefficiency of SVC as compared to non-scalable coding. As can be seen from the first graph, the performance of bottom-up encoding is roughly equivalent to non-scalable coding for the base layer (cost around 0%), since the base layer is optimized on its own. On the other hand, the enhancement layer cost is around 20%. With the new approach, the enhancement layer cost can be significantly reduced to around 10%, which comes at the cost of increased base layer cost (around 20%).

Besides providing better enhancement layer coding efficiency, which may be a highly desired feature, the new approach exhibits lower encoding complexity than the bottom-up approach.

The physical entities according to the invention, including the encoder 30, may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "predictive coding parameters generating unit", "first layer prediction performing unit", "first layer residual generating unit", "first layer representation coding unit", "second layer prediction performing unit", "second layer representation coding unit" and "second layer residual generating unit" are used herewith, no restriction is made regarding how distributed these units may be and regarding how gathered units may be. That is, the constituent elements of a unit may be distributed in different software or hardware components or devices for bringing about the intended function. A plurality of distinct units may also be gathered for providing the intended functionalities. The same applies to all the units illustrated in FIG. 10 (i.e. all boxes with label).

Any one of the above-referred units of a server, or a network node, may be implemented in hardware, software, field-programmable gate array (FPGA), application-specific integrated circuit (ASICs), firmware or the like.

In further embodiments of the invention, any one of the above-mentioned and/or claimed predictive coding parameters generating unit, first layer prediction performing unit, first layer residual generating unit, first layer representation coding unit, second layer prediction performing unit, second layer representation coding unit and second layer residual generating unit is replaced by predictive coding parameters generating means, first layer prediction performing means, first layer residual generating means, first layer representation coding means, second layer prediction performing means, second layer representation coding means and second layer residual generating means respectively, or by a predictive coding parameters generator, first layer prediction performer, first layer residual generator, first layer representation coder, second layer prediction performer, second layer representation coder and second layer residual generator respectively, for performing the functions of the predictive coding parameters generating unit, first layer prediction performing unit, first layer residual generating unit, first layer representation coding unit, second layer prediction performing unit, second layer representation coding unit and second layer residual generating unit.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A scalable video coding method for encoding a video sequence into a bit stream, the resulting bit stream being partitionable into at least a first layer representation and a second layer representation of the video sequence, wherein the second layer representation has an enhanced spatial or quality resolution compared to the first layer representation, comprising:
generating predictive coding parameters for the second layer representation of at least one region of an image of the video sequence, using previously reconstructed pixels in the reconstructed second layer representation;
performing prediction for the first layer representation of the at least one region of the image of the video sequence, using the predictive coding parameters and the previously reconstructed pixels in the reconstructed second layer representation, to generate a first layer prediction signal;
generating a first layer residual based on the difference between the at least one region of the image of the video sequence and the first layer prediction signal; and
encoding, as at least part of the first layer representation, the predictive coding parameters and the first layer residual.

2. The method of claim 1, wherein the performing prediction to generate the first layer prediction signal includes performing at least one of motion-compensated prediction, intra coding prediction, and disparity-compensated prediction.

3. The method of claim 1, further comprising:
encoding, as at least part of the second layer representation, a telescopic indication indicating that, when decoding, the predictive coding parameters associated with the first layer representation are also to be used for the second layer representation.

4. The method of claim 3, wherein the encoding, as at least part of the second layer representation, includes:
encoding an inter-layer prediction residual indication indicating that, when decoding, the first layer residual is to be used for generating a second layer residual approximating the differences between the at least one region of the image of the video sequence and a second layer prediction signal.

5. The method of claim 3, further comprising:
performing prediction for the second layer representation of the at least one region of the image of the video sequence, using the predictive coding parameters and previously reconstructed pixels in the reconstructed second layer representation, to generate a second layer prediction signal; and
generating a second layer residual based on the difference between the at least one region of the image of the video sequence and the second layer prediction signal;
wherein the encoding, as at least part of the second layer representation, further includes encoding the second layer residual.

6. The method of claim 5, wherein the performing prediction to generate the second layer prediction signal includes performing at least one of motion-compensated prediction, intra coding prediction, and disparity-compensated prediction.

7. The method of claim 1, wherein the generating predictive coding parameters includes:
selecting at least one of an inter coding technique and an intra coding technique; and
generating, in accordance with said selecting, at least one of inter coding parameters responsive to selection of an inter coding technique, and intra coding parameters responsive to selection of an intra coding technique.

8. The method of claim 1, wherein the generating predictive coding parameters and the generating the first layer residual are optimized with respect to the second layer representation.

9. The method of claim 1, wherein the second layer representation has an enhanced spatial resolution compared to the first layer representation, and wherein the performing prediction to generate the first layer prediction signal is carried out using the predictive coding parameters and previously reconstructed pixels in the reconstructed second layer representation, after downsampling of the predictive coding parameters and the previously reconstructed pixels in the reconstructed second layer representation.

10. The method of claim 1, wherein the second layer representation has an enhanced quality resolution compared to the first layer representation, and wherein the performing prediction to generate the first layer prediction signal is carried out using the predictive coding parameters, without any modification to the predictive coding parameters.

11. The method of claim 1, wherein the generating predictive coding parameters includes:
selecting at least an inter coding technique; and
generating at least inter coding parameters in such a manner that the at least one region of an image of the video sequence is predictively encoded as a B slice.

12. A scalable video encoder configured to encode a video sequence into a bit stream, the resulting bit stream being partitionable into at least a first layer representation and a second layer representation of the video sequence, wherein the second layer representation has an enhanced spatial or quality resolution compared to the first layer representation, the encoder comprising one or more processing circuits configured as:
a predictive coding parameters generating unit configured to generate predictive coding parameters for the second layer representation of at least one region of an image of the video sequence, using previously reconstructed pixels in the reconstructed second layer representation;
a first layer prediction performing unit configured to perform prediction for the first layer representation of the at least one region of the image of the video sequence, using the predictive coding parameters and previously reconstructed pixels in the reconstructed second layer representation, to generate a first layer prediction signal;
a first layer residual generating unit configured to generate a first layer residual, based on the difference between the at least one region of the image of the video sequence and the first layer prediction signal; and
a first layer representation coding unit configured to encode, as at least part of the first layer representation, the predictive coding parameters and the first layer residual.

13. The encoder of claim 12, wherein the first layer prediction performing unit configured to perform prediction to generate the first layer prediction signal is also configured to perform at least one of motion-compensated prediction, intra coding prediction, and disparity-compensated prediction.

14. The encoder of claim 12, wherein the one or more processing circuits are further configured as:
a second layer representation coding unit configured to encode, as at least part of the second layer representation, a telescopic indication indicating that, when decoding, the predictive coding parameters associated with the first layer representation are also to be used for the second layer representation.

15. The encoder of claim 14, wherein the second layer representation coding unit is also configured to encode an inter-layer prediction residual indication indicating that, when decoding, the first layer residual is to be used for generating a second layer residual approximating the differences between the at least one region of the image of the video sequence and a second layer prediction signal.

16. The encoder of claim 14, wherein the one or more processing circuits are further configured as:
- a second layer prediction performing unit configured to perform prediction for the second layer representation of the at least one region of the image of the video sequence, using the predictive coding parameters and previously reconstructed pixels in the reconstructed second layer representation, to generate a second layer prediction signal; and
- a second layer residual generating unit configured to generate a second layer residual, based on the difference between the at least one region of the image of the video sequence and the second layer prediction signal;
- wherein the second layer representation coding unit is also configured to encode the second layer residual.

17. The encoder of claim 14, wherein the second layer prediction performing unit is configured to perform prediction to generate the second layer prediction signal, and wherein said prediction to generate the second layer prediction signal includes the performance of at least one of motion-compensated prediction, intra coding prediction, and disparity-compensated prediction.

18. The encoder of claim 12, wherein the predictive coding parameters generating unit is further configured to:
- select at least one of an inter coding technique and an intra coding technique; and
- generate, in accordance with said selection, at least one of inter coding parameters responsive to selection of an inter coding technique, and intra coding parameters responsive to selection of an intra coding technique.

19. The encoder of claim 12, wherein the predictive coding parameters generating unit and the first layer residual generating unit are optimized with respect to the second layer representation.

20. The encoder of claim 12, wherein the second layer representation has an enhanced spatial resolution compared to the first layer representation, and wherein the first layer prediction performing unit is further configured to use the predictive coding parameters and previously reconstructed pixels in the reconstructed second layer representation, after downsampling of the predictive coding parameters and the previously reconstructed pixels in the reconstructed second layer representation.

21. The encoder of claim 12, wherein the second layer representation has an enhanced quality resolution compared to the first layer representation, and wherein the first layer prediction performing unit is further configured to use the predictive coding parameters, without any modification to the predictive coding parameters.

22. The encoder of claim 12, wherein the predictive coding parameters generating unit is configured to:
- select at least an inter coding technique; and
- generate at least inter coding parameters in such a manner that the at least one region of an image of the video sequence is predictively encoded as a B slice.

23. A computer program product stored in a non-transitory computer-readable medium, said computer program product comprising program instructions for implementing scalable video coding by encoding a video sequence into a bit stream, the resulting bit stream being partitionable into at least a first layer representation and a second layer representation of the video sequence, wherein the second layer representation has an enhanced spatial or quality resolution compared to the first layer representation, the computer program product comprising computer program code which, when run on an encoder, configures the encoder to:
- generate predictive coding parameters for the second layer representation of at least one region of an image of the video sequence, using previously reconstructed pixels in the reconstructed second layer representation;
- perform prediction for the first layer representation of the at least one region of the image of the video sequence, using the predictive coding parameters and the previously reconstructed pixels in the reconstructed second layer representation, to generate a first layer prediction signal;
- generate a first layer residual based on the difference between the at least one region of the image of the video sequence and the first layer prediction signal; and
- encode, as at least part of the first layer representation, the predictive coding parameters and the first layer residual.

* * * * *

UNITED STATES PATENT AND TRADEMARK OFFICE
CERTIFICATE OF CORRECTION

Page 1 of 2

PATENT NO. : 9,106,920 B2
APPLICATION NO. : 13/318426
DATED : August 11, 2015
INVENTOR(S) : Rusert et al.

It is certified that error appears in the above-identified patent and that said Letters Patent is hereby corrected as shown below:

On the Title Page, in item (75), under "Inventors", in Column 1, Line 1, delete "Vista" and insert -- Kista --, therefor.

On the Title Page, in item (57), under "ABSTRACT", in Column 2, Line 3, delete "$2O_2$)" and insert -- $2O_2$) --, therefor.

On the Title Page, in item (57), under "ABSTRACT", in Column 2, Line 4, delete "($2O_2$)" and insert -- ($2O_2$) --, therefor.

On the Title Page, in item (57), under "ABSTRACT", in Column 2, Line 5, delete "($2O_1$)." and insert -- ($2O_1$). --, therefor.

On the Title Page, in item (57), under "ABSTRACT", in Column 2, Line 6, delete "(si)" and insert -- (s1) --, therefor.

On the Title Page, in item (57), under "ABSTRACT", in Column 2, Line 16, delete "($2O_1$)." and insert -- ($2O_1$). --, therefor.

In the Specification

In Column 7, Line 53, delete "salved" and insert -- solved --, therefor.

In Column 10, Line 19, delete "EL" and insert -- BL --, therefor.

In Column 10, Line 47, delete "EL" and insert -- BL --, therefor.

In Column 10, Line 47, delete "$QP_{EL}$." and insert -- $QP_{BL}$. --, therefor.

In Column 11, Line 56, delete "POT" and insert -- PCT --, therefor.

Signed and Sealed this
Third Day of May, 2016

Michelle K. Lee
*Director of the United States Patent and Trademark Office*

In Column 11, Line 67, delete "EL reference pictures, and EL" and insert -- BL reference pictures, and BL --, therefor.

In Column 13, Line 4, delete "EL" and insert -- BL --, therefor.